United States Patent [19]

Ingram et al.

[11] E Re. 28,890

[45] Reissued July 6, 1976

[54] ACTUATOR ASSEMBLIES FOR HYDRAULIC BRAKING SYSTEMS

[75] Inventors: Brian Ingram, Lugamo, Australia; David Anthony Harries, Solihull; Lancelot Phoenix, Birmingham, both of England

[73] Assignee: Girling Limited, Birmingham, England

[22] Filed: Jan. 15, 1974

[21] Appl. No.: 433,510

Related U.S. Patent Documents

Reissue of:

[64] Patent No.: 3,694,038
Issued: Sept. 26, 1972
Appl. No.: 73,202
Filed: Sept. 17, 1970

[30] Foreign Application Priority Data

| | | |
|---|---|---|
| Sept. 17, 1969 | United Kingdom | 45705/69 |
| Jan. 6, 1970 | United Kingdom | 531/70 |
| Mar. 8, 1970 | United Kingdom | 13117/70 |

[52] U.S. Cl. ..... 303/21 F; 188/181 A; 303/10; 303/21 AF

[51] Int. Cl.[2] ..... B60T 8/06

[58] Field of Search ..... 303/21 F, 21 AF, 61–63, 303/68–69, 10; 188/181 A, 181 R

[56] References Cited

UNITED STATES PATENTS

| | | | |
|---|---|---|---|
| 3,544,171 | 12/1970 | Lester et al. | 303/21 AF UX |
| 3,556,609 | 1/1971 | MacDuff | 303/21 F |
| 3,556,615 | 1/1971 | Stelzer | 303/21 F |
| 3,560,056 | 2/1971 | Stelzer | 303/21 F |
| 3,576,350 | 4/1971 | Larsen | 303/21 F |

*Primary Examiner*—Trygve M. Blix
*Assistant Examiner*—Douglas C. Butler
*Attorney, Agent, or Firm*—Imirie, Smiley & Linn

[57] ABSTRACT

In an actuator assembly for an hydraulic braking system the effective volume of a chamber through which hydraulic fluid under pressure is supplied to a wheel brake is adapted to be varied between a minimum and a maximum value by movement of a piston assembly working in a bore in communication with the chamber. An actuator piston having first and second different faces of different areas normally holds the piston assembly in a position in which the effective volume of the chamber is at a minimum until equal hydraulic pressures are applied to the areas of the actuator piston to cause the actuator piston to retract and permit the piston assembly to be withdrawn whereby the effective volume of the chamber is increased.

25 Claims, 8 Drawing Figures

ACTUATOR ASSEMBLIES FOR HYDRAULIC BRAKING SYSTEMS

Matter enclosed in heavy brackets [ ] appears in the original patent but forms no part of this reissue specification; matter printed in italics indicates the additions made by reissue.

This invention relates to improvements in actuator assemblies for use in hydraulic braking systems for vehicles of the kind comprising at least one chamber having an inlet for connection to a fluid pressure source, for example a pedal-operated master cylinder, and an outlet for connection to a slave cylinder of a wheel brake.

According to our invention in an actuator assembly of the kind set forth for use in an hydraulic braking system for a vehicle, the effective volume of the chamber is adapted to be varied between a normal minimum value, in which the inlet and outlet connections are both open, and a maximum value, in which the inlet connection is closed and the outlet connection is open, by movement of a piston assembly working in a cylinder bore in a housing in communication in the chamber, the piston assembly being normally urged in a direction in which the effective volume of the chamber is at the minimum value by an actuator piston working in a bore in the housing and adapted to be subjected over a first area to an end remote from the piston assembly to hydraulic fluid under pressure, and the housing is provided with a further inlet connection for admitting into the bore in which the actuator piston works, when the deceleration of a braked wheel controlled by a supply of fluid from the outlet connection exceeds a predetermined value, hydraulic fluid under pressure which acts on the actuator piston over a second area to retract the actuator piston away from the chamber and permit the piston assembly to be withdrawn to increase the effective volume of the chamber.

Initial retraction movement of the piston assembly enables a valve to close thereby cutting off communication between the inlet connection and the chamber, and further movement of the piston assembly in the same direction reduces the pressure in a line between the outlet connection and a slave cylinder of the wheel brake to which the outlet connection is adapted to be connected.

Preferably the actuator piston is of differential outline working in a stepped bore and engages at its end of smaller diameter with the piston assembly, the first area being located at the base of a recess or blind bore in the end of the piston of greater diameter, and the second area being defined by a shoulder at a step in diameter between portions of the stepped piston of different diameters.

In a normal operative position in which the effective volume of the chamber is at its minimum value the shoulders on the actuator piston is spaced from a complementary shoulder in the change in diameter of the stepped bore and the annular space between the shoulder and surrounding a portion of the actuator piston of lesser diameter defines a second chamber into which hydraulic fluid under pressure is adapted to be admitted through the said further inlet.

Conveniently a third piston working in the recess or blind bore in the end of the actuator piston of greater diameter is urged into the recess or bore by a compression spring and the inner end of the third piston defines with the inner end of the recess or bore forming the first area a chamber into which hydraulic fluid under pressure is admitted through an axial bore in the third piston.

Preferably the actuator assembly incorporates means for delaying re-application of a wheel brake following cut-off and relief of the supply of fluid to a slave cylinder. These means preferably incorporate an orifice or other metering device which serves to delay the release of pressure fluid from the second chamber when the supply of hydraulic fluid under pressure to that chamber is terminated.

The piston assembly may comprise a single expander piston working in a bore in the housing and controlled by a single actuator piston. Alternatively at least two expander pistons working in separate parallel bores may be controlled by a single actuator piston, in which each expander piston is adapted to control the effective volume of a chamber provided with separate inlet and outlet connections and operation of a spring loaded valve means for controlling communication between the inlet connection and the chamber of which the effective volume is variable by that expander piston.

In other construction a single expander piston in the form of a two part axially separable assembly is adapted to regulate the effective volumes of a pair of chambers and provided with an inlet and an outlet connection.

Some embodiments of our invention are illustrated in the accompanying drawings in which.

Figure 1:
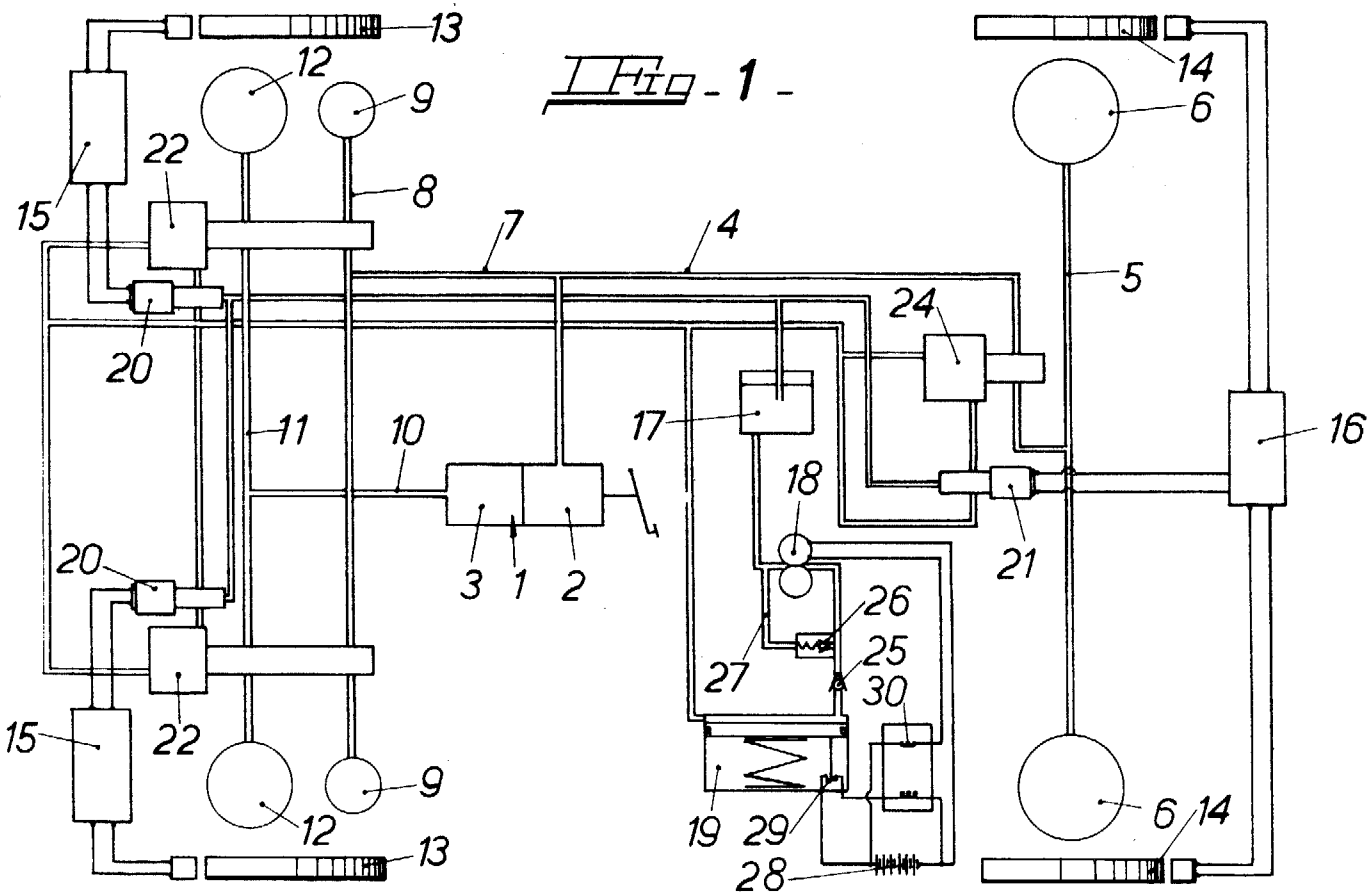
FIG. 1 is a layout of an hydraulic braking system.

In the layout illustrated in FIG. 1, 1 is a pedal-operated tandem master cylinder having two pressure spaces 2 and 3. The pressure space 2 is connected through pipe-lines 4 and 5 to slave cylinders 6 for actuating brakes on the rear wheel of the vehicle, and through pipe-lines 7 and 8 to slave cylinders 9 for actuating brakes on the front wheels of the vehicle. The pressure space 3 is also connected through pipe-lines 10 and 11 to separate slave cylinders 12 for actuating the brakes on the front wheels of the vehicle.

When the brakes are applied the deceleration of each front wheel is sensed by an electrically inductive sensor 13, and the deceleration of each rear wheel is sensed by an electrically inductive sensor 14.

When the deceleration of one or more wheels exceeds a predetermined value the A.C. output from the sensor on that wheel or wheels in question is fed to electronic control means which convert the A.C. signal into a D.C. output. Specifically the output from each sensor 13 is fed to a separate electronic control module 15, and the A.C. signals from the sensors 14 are fed to a common electronic control module 16.

The system includes a supply circuit of hydraulic fluid under pressure comprising a reservoir 17 for hydraulic fluid feeding an electrically driven pump 18. The pump 18 pumps fluid under pressure to an hydraulic accumulator 19. Fluid under pressure from the hydraulic accumulator 19 is delivered through a first circuit to a pair of control valves 20, and is then returned to the reservoir 17. Simultaneously fluid under pressure from the hydraulic accumulator 19 is delivered through a second circuit to a third control valve 21 and is then returned to the reservoir 17.

Each control valve 20 is adapted to regulate the supply of fluid from the first circuit to an actuator 22 for controlling the braking effort applied to one of the front wheels of the vehicle in response to the D.C. output signal received from the control module 15 to which it is connected. The output signals from each control module 15 are responsive to the deceleration of the front wheel with which the module 15 is associated.

The control valve 21 is adapted to regulate the supply of fluid from the second circuit to an actuator 24 for controlling the braking effort applied to the rear wheels of the vehicle in response to the D.C. output signal received from the control module 16. The output signals from the control module 16 is responsive to the deceleration of the rear wheels of the vehicle.

*Fluid from accumulator 19 is also delivered directly to actuators 22, 26 to maintain them inoperative in a manner to be described.*

A non-return valve 25 is located in the output side of the pump 18 to ensure that leak-back of pressure cannot occur in the system which is maintained at substantially 300 p.s.i. by the pump. A relief valve 26 is fitted in the line between the pump 18 and the non-return valve 25 to protect the system from over-pressurization, any overspill being returned to the reservoir through a by-pass line 17.

The pump 18 is driven from the battery 28 of the vehicle, and the accumulator 19 incorporates a pressure switch 29 of which the contacts are held open when the system is fully pressurized. When the pressure of the system falls, the contacts of the switch 29 close and energize a relay 30 to start up the pump 18 until the system attains a normal working pressure when it is switched off by the contacts of the pressure switch 29 which open automatically again in response to the pressure attained in the hydraulic accumulator 19.

Figure 2:
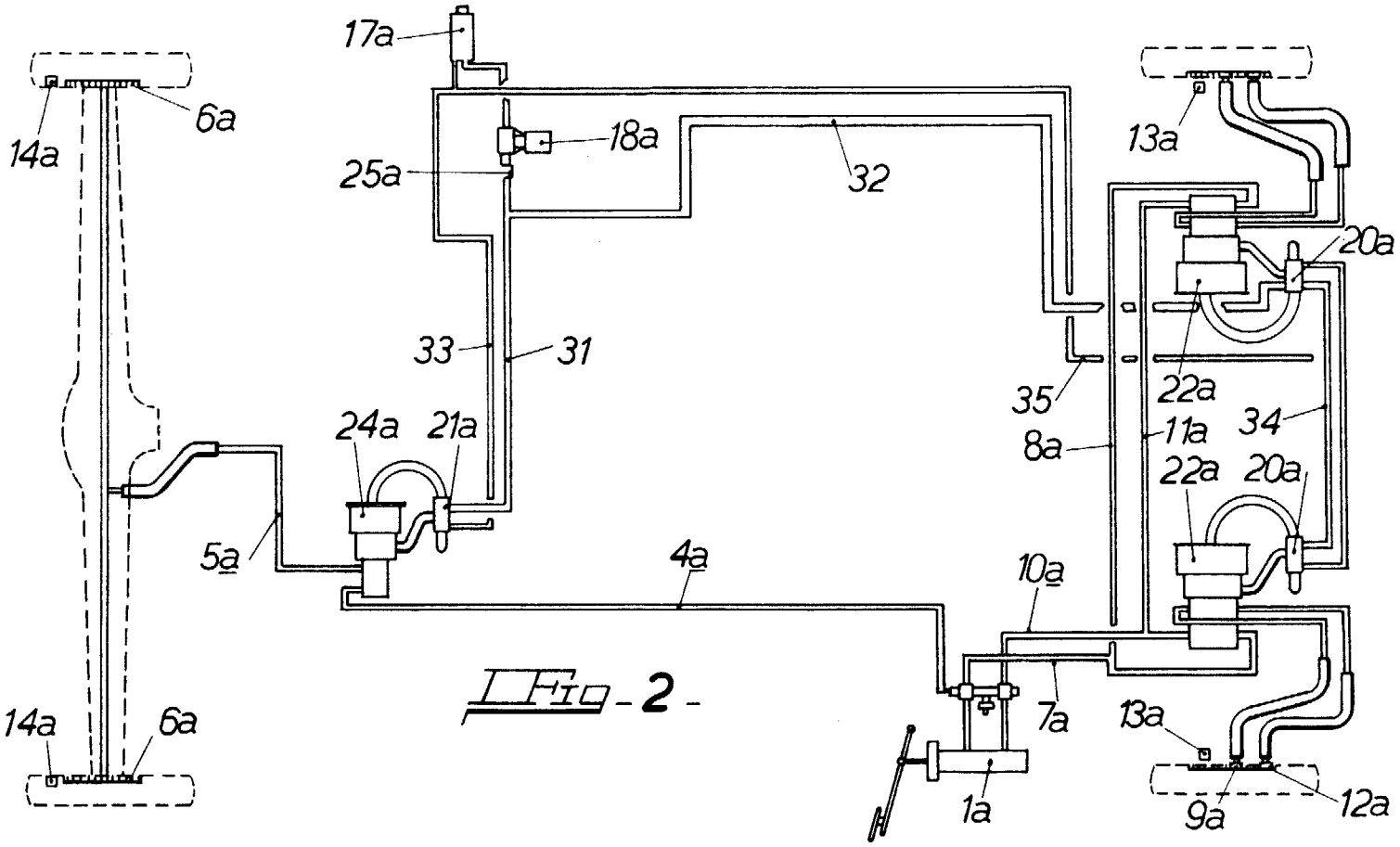
FIG. 2 is a layout of a braking system similar to the system illustrated in FIG. 1 but showing some modifications.

The braking system shown in the layout of FIG. 2 is similar to that illustrated in FIG. 1 and corresponding reference numerals qualified by the suffix a have been used to indicate corresponding parts.

In this embodiment the hydraulic accumulator 19 has been omitted and the electrically driven pump 18a is supplied directly with fluid from the reservoir 17a. The electrically driven pump 18a is provided with two outlet lines 31 and 32. The line 31 delivers fluid under pressure to the control valve 21a and, when the control valve 21a is open, fluid is returned from the control valve 21a to the reservoir 17a through a return line 33. Similarly the pump 18a delivers fluid under pressure through the pipe-line 31 to the control valves 20a which are connected in series by a pipe-line 34. When the control valves 20a are open, fluid is returned from the control valves 20a to the reservoir 17a through a return line 35.

Normally the control valves 20a and 21a are closed so that hydraulic fluid under pressure is trapped in the lines 32 and 31 respectively on the downstream side of the non-return valve 18a between the valve 18a and the control valves.

Figure 3:
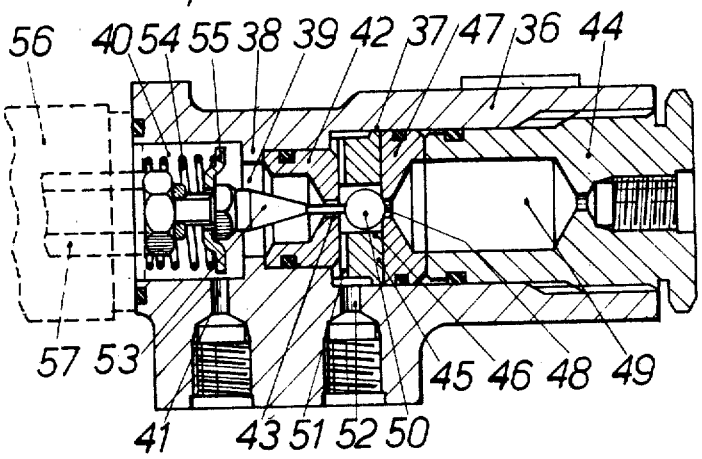
FIG. 3 is a longitudinal section through a control valve for use in the braking system of FIG. 1 or FIG. 2.

Each control valve 20, 20a and 21a is of the construction illustrated in FIG. 3 of the drawings. As illustrated 36 is a housing having a stepped cylindrical throughbore 37 of which portions of the bore are separated by a partition member 38 having a central opening 39. A chamber 40 between one face of the partition member 38 and one end of the housing is formed with a radial port 41 connected to the return line to the reservoir 17, 17a. The opposite face of the partition member 38 forms an abutment for the inner end of a cup-shaped sleeve 42 which is formed in its closed end with a central opening 43. The sleeve 42 is held in engagement with the partition member 38 by a plug 44 screwed into the opposite end of the bore 27 in a portion of enlarged diameter. A spacer member 45 having a central opening 46 of substantial diameter is clamped between the sleeve 42 and an adjacent face of an annular member 47 of which the opposite face is in abutment with the inner end of the plug 44.

The annular member 47 is provided with a central opening 48 of a diameter substantially equal to that of the opening 43 and is in communication with an axial passage 49 in the pump circuits.

A valve member in the form of a ball 50 is located in a chamber between the sleeve 42 and the annular member 47 and is defined by the opening 46. The ball 50 is adapted to engage with one of a pair of axially spaced seatings surrounding the openings 43 and 48 to prevent flow through that opening. The chamber 46 is connected by the actuator 22, 22a or 24, 24a through a radial passage 51 in the member 45 and a communicating radial port 52 in the cylinder wall.

Normally the ball 50 is held against the seating surrounding the opening 48 to cut-off communication between the high pressure circuit and the actuator 22, 22a or 24, 24a by a push-rod assembly 53 located in the chamber 40 and extending through the opening 43 at its inner end. The push-rod assembly 53 is urged in this direction by a pre-loaded spring 54 acting between an abutment plate 55 and the inner end of the casing 56 of a solenoid assembly 57 adapted to be energized by D.C. supply from one of the electronic control modules 15 or 16.

When the deceleration of one of the braked wheels exceeds a predetermined value, the solenoid 57 of the control valve 22, 22a or 24, 24a is energized by the D.C. supply from the module 15 or 16 associated with that wheel and the push-rod assembly 53 is withdrawn against the force in the pre-loaded spring 54. The high pressure fluid in the circuit acts on the ball 50 and urges it into engagement with the seating surrounding the opening 43 to cut-off communication with the reservoir 17, 17a through the port 41. Simultaneously fluid under pressure passes to the corresponding actuator 22, 22a or 24, 24a which operates in a manner to be described.

When the deceleration of the wheel is reduced to a value at least equal to the predetermined value, the solenoid 57 is de-energized and the pre-loaded spring 54 acts on the push-rod assembly 53 to urge the ball 50 into engagement with the seating surrounding the opening 48. The high pressure fluid previously supplied to the actuator 22, 22a or 24, 24a returns to the reservoir 17, 17a through the opening 43, the chamber 40 and the port 41.

Figure 4:
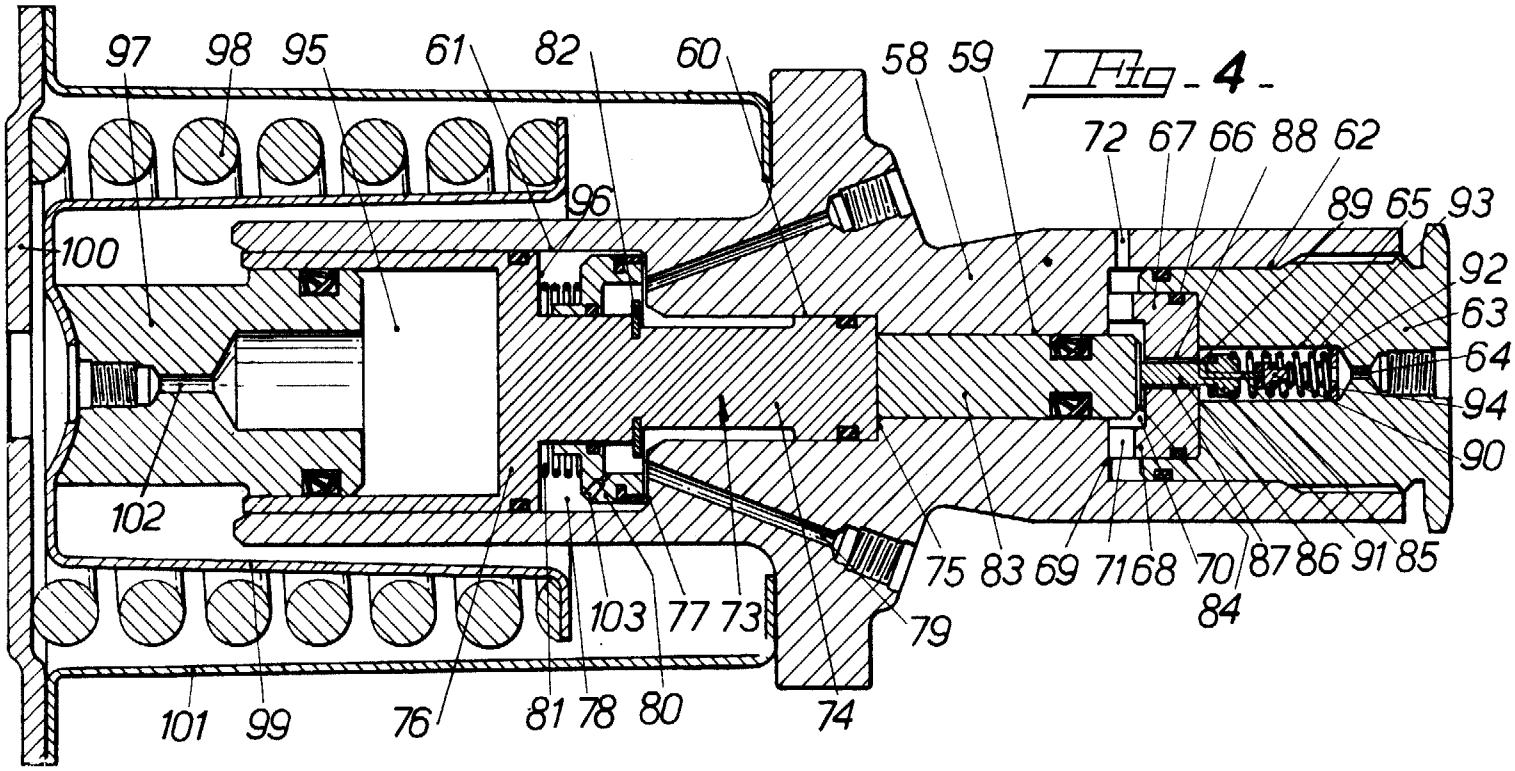
FIG. 4 is a longitudinal section through an actuator for use in the braking system of FIG. 1 or FIG. 2.

The actuator 24, 24a which is controlled by the control valve 21, 21a is illustrated in FIG. 4 of the accompanying drawings. The actuator 24 comprises a body 58 in which is formed a through bore having three stepped portions 59, 60 and 61 of constant progressively increased diameter. The smallest diameter portion 59 of the bore leads into bore portion 62 of substantial diameter terminating at one end of the body 58. A plug 63 having an axial inlet passage 64 for connection in the pipe-line 4, 4a leading to the rear wheel brakes is screwed in the outer end of the bore portion 62. The inlet passage 64 at its inner end leads into a bore 65 which is counterbored at 66 at its opposite end to receive a recessed annular member 67. The member 67 includes a forwardly extending annular flange 68 which abuts against a shoulder 69 at the step in diameter between the bore portions 59 and 62 and projects inwardly beyond the inner end of the plug 63. A chamber 70 defined between the shoulder 69 and adjacent face of the member 67 and the plug 63 is connected to the slave cylinders 6, 6a of the rear wheel brakes through radial openings 71 in the flange 68, and a port 72 in the cylinder wall.

A stepped piston assembly works in the stepped bore and comprises a differential actuator piston 73 working in the portions 60 and 61 of the bore. The piston is arranged such that when the outer end of the portion 74 of lesser diameter is in abutment with a step 75 at the change in diameter between the bore portions 60 and 59, the portion 76 of greater diameter is spaced from a step 77 at the change in diameter between the portions 61 and 60 to define a chamber 78 connected through an inclined drilling 79 to the port 52 of the control valve 21, 21a. A cup-shaped piston 80 located within the chamber 98 is slidably mounted on the piston portion 74 and is normally urged into engagement with the step 77 by a spring 81. The travel of the piston 80 relative to the portion 74 is limited by the engagement with the piston 80 of a stop ring 82 carried by the stepped piston portion 74.

An expander piston 83 works in the portion 59 of the bore and is of such a length as to project into the chamber 70 when the portion 74 of the stepped piston assembly is in engagement with the step 75. The end 81 of the expander piston 83 remote from the portion 74 is in abutment with the inner end of a pair of concentric valve stems 85 and 86 which project into the bore 65 in the plug 63 through a central opening 87 in the member 67. A clearance 88 is provided between the outer stem 86 and the opening 87 and a bleed hole 89 also connects the chamber 65 to a clearance 88 between the stem 85 and 86, so that fluid from the master cylinder 1, 1a can pass to the slave cylinders 6 of the rear wheel brakes when the brakes are applied normally. The inner stem 65 is longer than the outer stem 86, and each stem carries a valve head 90 and 91 respectively at its outer end. The inner ends of the valve stems 85 and 86 are normally urged into engagement with the outer end of the expander piston 83 by concentric compression springs 92 and 93 in abutment with a centrally apertured plate 94 in engagement with the end of the bore 65 remote from the expander piston 83.

The larger diameter portion 76 of the actuator piston 73 is formed in its outer end with an axially extending recess or blind bore of an area less than the area 96 of the step in diameter between the portions 76 and 74 of the piston 73. A piston 97 works the bore 95 and is urged towards the base of the recess by a spring 98 which acts as a stop. The spring 98 is located between the inner end of a cage 99 surrounding the portion of the body containing at least a part of the portion 61 of the bore and engaging with the piston 97. An abutment plate 100 is secured to the body 58 and is held in a fixedly spaced relationship thereto by an axially extending cage or shroud 101.

The piston 97 has an axial passage 102 leading into the recess 95 to which fluid under pressure is supplied from the hydraulic accumulator 19 or the pump 18a for applying to the piston a force in opposition to and greater than the force in the spring 98. The valves 90 and 91 are normally held in open positions when the brake is applied by a force acting on the pistons 73 and 88 which is greater than the force in the springs 92 and 93 plus the force exerted on the expander piston 83 by the fluid pressure from the master cylinder 1, 1a.

For normal operation of the system fluid under pressure is supplied from the master cylinder 1, 1a to the slave cylinders 6, 6a, 9, 9a and 12, 12a of the wheel brakes to apply the brakes.

When the deceleration of one of the rear wheels exceeds a predetermined value the solenoid 57 of the control valve 21, 21a is energized as described above to deliver fluid under pressure from the accumulator 19 or pump 17a to the chamber 78 in the bore portion 61. The pressure acts on the area 96 between the piston portions 74 and 76 to move the actuator piston 73 rearwardly from the step 75. Due to the loading in the springs 92 and 93 and the master cylinder pressure in the chamber 65 the expander piston 83 follows this movement to increase progressively the effective volume of the chamber 70 and permit the valve head 91 to cut off flow through the clearance 88, and subsequently permit the valve head 90 to seat on the head 91 and cut-off flow through a clearance between the concentric valve stems 85 and 86. Thus the supply of braking fluid from the master cylinder 1, 1a to the slave cylinders of the rear wheel brakes is cut-off. Thereafter further rearward movement of the actuator piston 73 and the expander piston 83 serve to increase still further the effective volume of the chamber 70 to relieve the pressure applied to the rear wheel brakes thus decreasing the rate of decleration of the wheels. During this movement the piston 80 is initially held in engagement with the step 77 by the force in the spring 81 until the piston 80 is carried rearwardly by the piston 73 due to the engagement with the piston 80 of the stop ring 82.

When the deceleration of the wheel is reduced to the predetermined value and the solenoid 66 is de-energized to close the control valve 21, 21a the supply of fluid from the accumulator 19 or pump 17a to the chamber 78 is cut-off and the chamber 78 is placed in communication through the control valve 21, 21a with the reservoir 17, 17a. Initially, fluid is returned rapidly to the reservoir 17, 17a until the piston 80 again engages return of fluid is less rapid as it is accomplished by a bleed through an orifice 103 in the piston 80. Thus there is a delay until a point is reached in which the valves 90 and 91 open sequentially to permit re-application of the brakes in the normal manner and at the original pressure as described above. However, before the point of re-application referred to above is reached, in any case the brakes are re-applied progressively at an intermediate pressure less than that of the master cylinder 1, 1a due to the progressive insertion of the outer end of the expander piston 83 into the chamber 70 to reduce the effective volume of the chamber and pressurize the trapped volume of fluid contained therein.

The delay in relieving the pressure in the chamber 78 due to the provision of the orifice 103 has the advantage that a sufficient interval of time is available for the sensors 14 to sense what is occuring during the progressive re-application of the brakes by the movement of the expander piston 83 into the chamber 70. Specifically movement of the actuator piston in a direction to permit the valves 90 and 91 to close it faster than in the opposite direction to open the valve.

Reciprocation of the expander piston 83 may occur a number of times to affect re-application of the brakes in response to wheel acceleration or deceleration before the valve 90 and 91 are re-opened. Such reciprocation of the expander piston 83 is controlled by movement of the actuator piston 73 which in turn are dictated by operation of the control valve 21, 21a regulating the supply of fluid under pressure to the chamber 78 as described above. Reopening of the valves 90 and 91 occurs only when the braked wheel contacts a surface of a co-efficient of friction higher than the surface with which that wheel was previously in contact and capable of accepting a braking force corresponding to the fluid pressure trapped in the line between the actuator 24, 24a and the slave cylinder 6, 6a in accordance with the position of the expander piston 83. Alternatively, re-opening of the valves 90 and 91 occurs when the pedal pressure applied to the master cylinder 1, 1a s reduced by a sufficient amount.

The actuator described above with reference to FIG. 1 is suitable for use when only the pressure in a single ine to a wheel brake or brakes is/are to be regulated.

Where the brakes on wheels of a vehicle are cross-connected, that is to say when separate slave cylinders of the same brakes are supplied with fluid from different pressure spaces of a master cylinder, as for example he front wheel brakes of the layout illustrated in FIGS. and 2 of the drawings, it is necessary for the pressure n each supply line to the slave cylinders of the same rake to be regulated simultaneously.

This can be achieved by a pair of expander pistons 83 rranged in separate bores in the body of the actuator nd operated simultaneously by a single actuator piston ssembly. Such a tandem actuator assembly is illustrated in FIG. 5 of the drawings and corresponding eference numerals qualified by the suffix b have been sed to indicate the parts which correspond to and are dentical with those in the actuator described above ith reference to FIG. 4.

Figure 5:
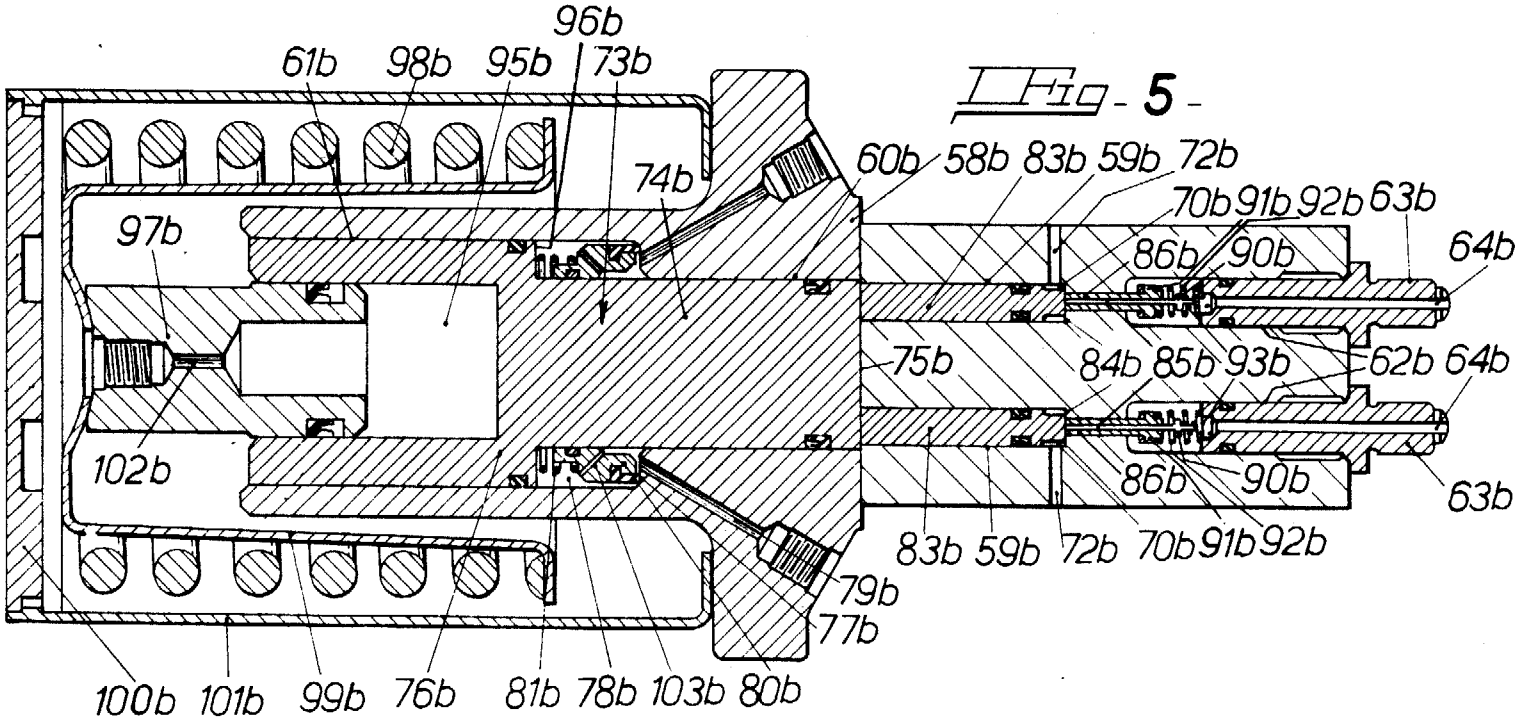
FIG. 5 is a longitudinal section through an actuator similar to that shown in FIG. 2 but of tandem construction incorporating a pair of expander pistons arranged in parallel and adapted to be actuated by a single piston.

It will be seen from FIG. 5 of the drawings that two xpander pistons 83b are provided and each piston egulates the effective volume of a chamber 70b at the uter end of bore portion 59b in which that piston orks. The plugs 63b are each connected in the pipenes 11, 11a and 8, 8a to the separate slave cylinders 2, 12a, 9, 9a of the brakes on one front wheel of the ehicle, and the passages 72b leading from the chambers 70b are connected in corresponding pipe-lines on the downstream slave cylinder side.

An actuator as illustrated in FIG. 5 is provided for each of the front wheels of the vehicle and each actuator is controlled by a separate control valve 20, 20a responsive to the deceleration sensed by the sensor 13, 13a of the wheel supplying a signal to the control module 15 of that control valve.

When the brakes are applied by operation of the master cylinder 1, 1a the slave cylinders 12, 12a and 9, 9a are operated by the supply of fluid under pressure through the inlet ports 64b the chambers 71b and the outlet passages 72b.

When the deceleration of one of the front wheels exceeds a predetermined value, the control valve responsive to deceleration of that wheel supplies high pressure fluid to the chamber 78b as described above with reference to FIG. 4 and the subsequent sequence of operation is as described above except that both expander pistons 83b are operated simultaneously to regulate the supply of fluid pressure through the pipeline 8, 8a and 11, 11a simultaneously.

The advantage of the construction illustrated in FIG. 5 is that only half the stroke is required as compared with that of in-line assembly. Furthermore normal braking performance is available in the event of failure of one of the expander pistons 83b or its associated braking system. That is to say the total force applied by the actuator piston 73b is then applied to one expander piston area resulting in twice the output pressure being applied to its associated braking circuit.

In the embodiments described above the single actuator 24, 24a and each tandem actuator 22, 22a may each be embodied into a single unit with the control valve 21, 21a or 20, 20a by which it is controlled.

In the braking systems described above with reference to FIGS. 1 and 2 the brakes on the front wheels of the vehicle are applied from separate pairs of slave cylinders 9, 9a and 12, 12a. Preferably, each pair of slave cylinders actuates a single disc brake. When the slave cylinders of each pair are of equal diameters and cross-section the expander pistons 83b are of equal cross-section. However, when the slave cylinder of each pair are of different diameter, the cross-section areas of the expander pistons 83b are different to compensate for the differencd in cross-section area between the slave cylinders as shown in the actuator illustrated in FIG. 6 of the drawings.

Figure 6:
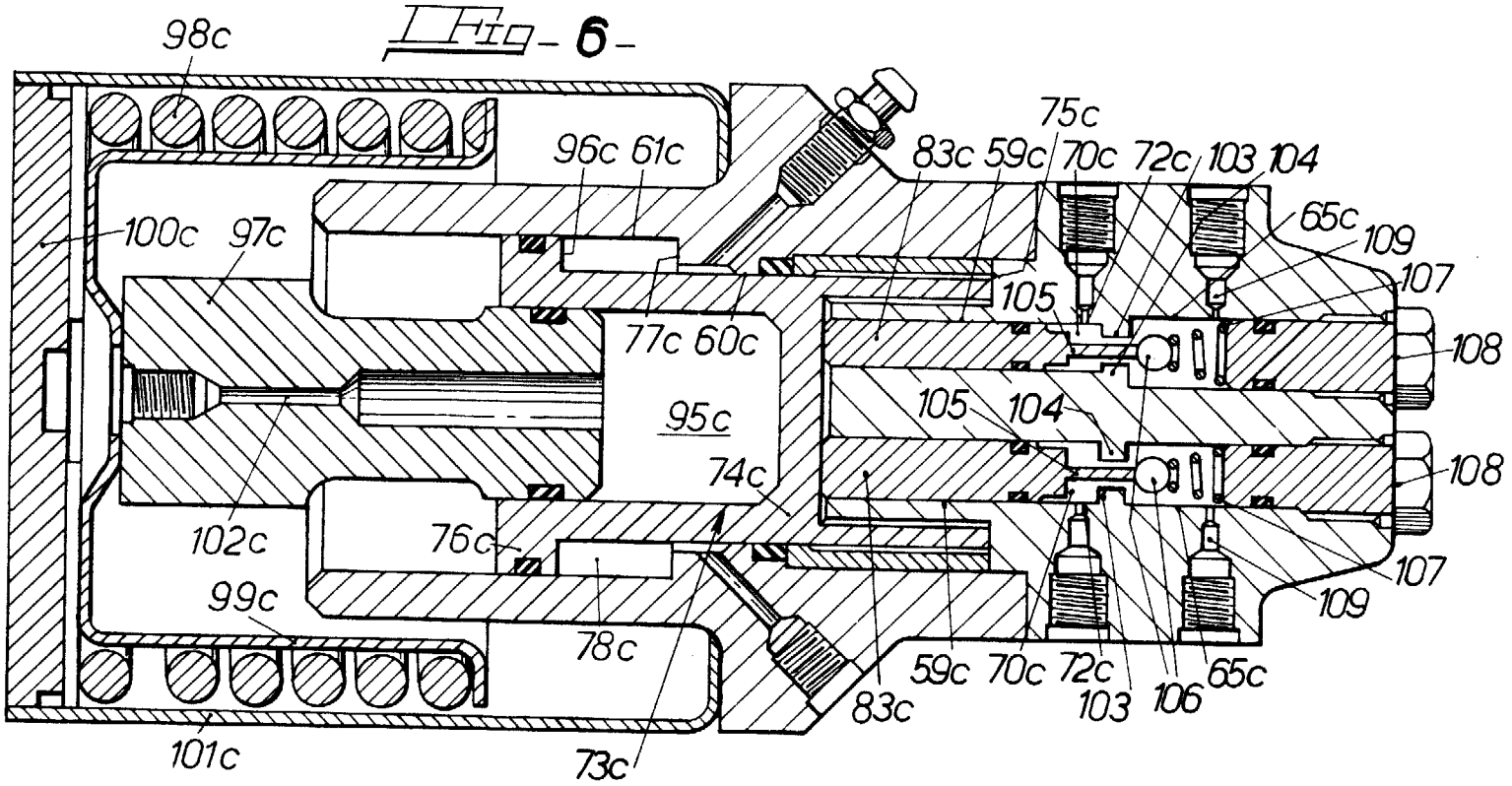
FIG. 6 is a longitudinal section through an actuator similar to the actuator of FIG. 5 but shown some modifications.

The actuator illustrated in FIG. 6 of the drawings is substantially identical with the actuator ilustrated in FIG. 4 and corresponding reference numerals, qualified by the suffix c have been applied to corresponding parts.

In the actuator illustrated in FIG. 6 of the drawings the spaced parallel bore portions 72c in which the expander pistons 83c work, are of different diameters, in total less than that of the actuator piston 73c. The outer end of each bore portion 72c leads into a bore 65c through an opening 103 in an annular partition 104 through which projects a stem 105 at the inner end of the expander piston 83c working in the bore 65c with which that bore 72c is in communication. Each stem 105 is adapted to engage a valve member 106 in the form of a ball which is normally urged towards a seating surrounding the opening 103 in the partition by means of a spring 107 acting between the ball 106 and a plug 108 screwed into the outer end of that bore 65c. The bores 65c which are of equal diameters, are connected to the master cylinder 1, 1a through radial ports 109.

In the position shown in the drawings, the expander pistons 83c are in positions in which the chambers defined by the bore portions 70c are of minimum effective volumes. In this position hydraulic fluid is supplied to the slave cylinders of the brake circuits through the radial ports 72c in the cylinder wall at pressures commensurate with the capacities of the slave cylinders so that each slave cylinder applies an equal force to the brake.

When the deceleration of a braked wheel exceeds a predetermined value, and the actuator piston 73c is retracted due to the force in the springs 107 and the balls 106 engage with their seatings and cut off communication between the bores 65c and the chambers 70c. Thereafter, further movement of the expander pistons 83c in the same direction increases the effective volumes of the chambers 70c but at different rates to compensate for the differences in the volumes of hydraulic fluid supplied to the slave cylinders in accordance with their respective capacities. This ensures that, although the braking pressure supplied to the brakes of the separate braking circuits is relieved, the rate at which this is achieved is chosen to maintain equal braking efforts on the brakes of the circuit.

In the actuators described above with reference to FIGS. 4 and 5 of the drawings means are incorporated to delay re-application of a wheel brake following cut-off in the supply of braking fluid to the brakes and subsequent reduction in the pressure of the braking fluid when the deceleration of the braked wheel has exceeded a predetermined value.

Figure 7:
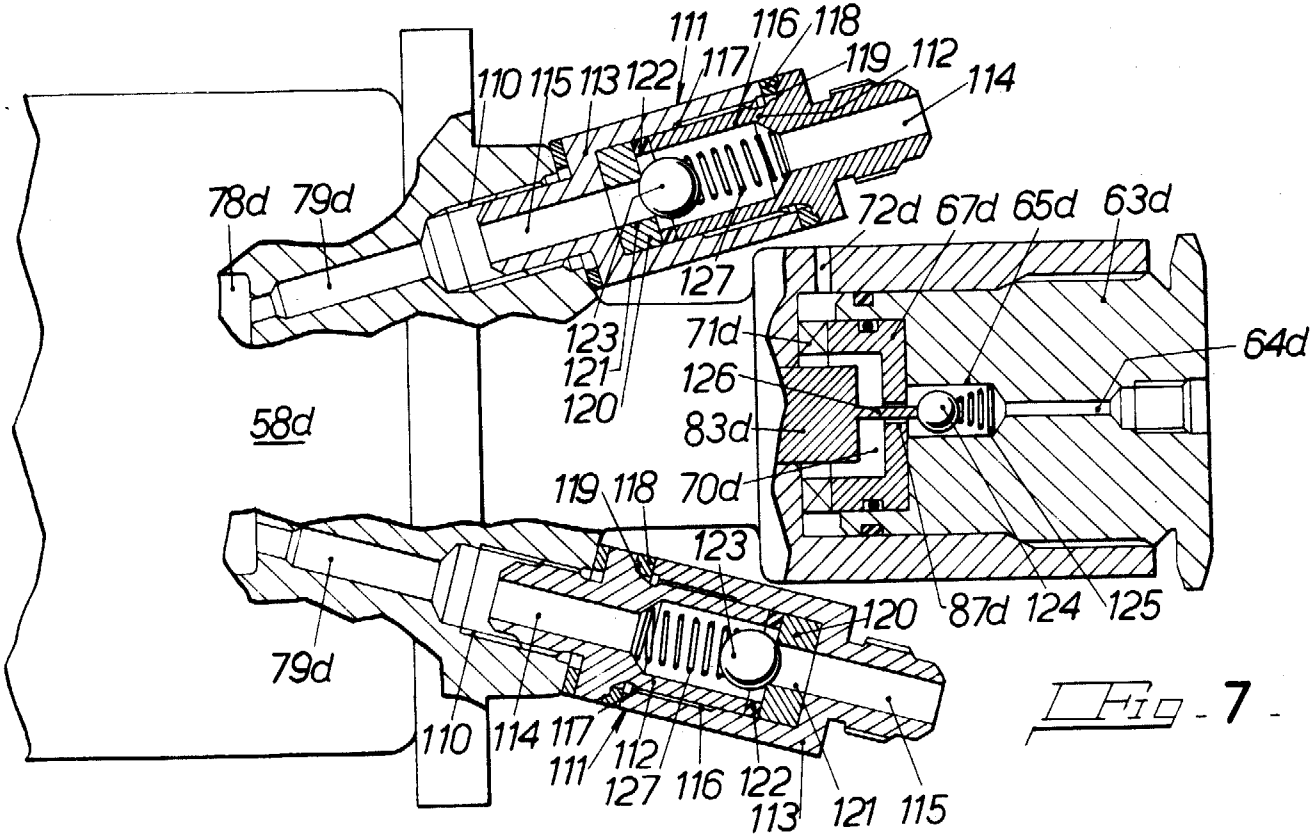
FIG. 7 is a longitudinal section of portion of an actuator shown restrictor assemblies.

The actuator illustrated in FIG. 7 of the drawings comprises a modified form of the actuator illustrated in FIG. 4 but the modifications illustrated in FIG. 7 could also be embodied in the construction of the FIG. 5. In the embodiment of FIG. 7 reference numerals qualified by the suffix d have been applied to parts which correspond to those in FIG. 4.

In fact the actuator illustrated in FIG. 7 is identical with that illustrated in FIG. 4 except that the piston 80 and the spring 81 have been omitted, and the valve stems 86 and 85 and the heads 91 and 90 which they carry have been replaced by a modified valve assembly.

In FIG. 7 the body 58d of the actuator is provided with a pair of inclined drillings 79d leading into the chamber 78d. Each drilling 79d is provided at its outer end with an internally screw-threaded counterbore 110 into which is screwed one end of a one-way valve assembly 111. Each one-way valve assembly 111 comprises a pair of complementary housing members 112, 113. Each housing member 112, 113 is provided with an axial through bore 114 and 115 respectively which is counterbored at 116 and 117 respectively for a substantial portion of its length. The housing member 112 is reduced in external diameter for substantially the length of the counterbore 116, and that portion of the housing member 112 is screwed into engagement in the counterbore 117 of the housing member 111.

An annular washer 118 of deformable material, suitably copper is located between the outer end of the housing member 13 and a shoulder at the step in diameter of the external surface of the housing member 112. The shoulder is stepped at 119 so that when the housing members are clamped together, the material of the washer 118 is deformed over the step to form an effective seal between the housing members.

A plate 120 having a central orifice 121 is clamped between the base of the counterbore 117 in the housing member 113 and the inner end of the housing member 112, and a resilient annular sealing ring 122 interposed between the housing member 112 and the plate 120 forms a seal between the housing members 112, 113 and the plate 120.

A valve member 123 in the form of a ball located within a chamber defined by the counterbore 116 is normally urged into engagement with a valve seating surrounding the orifice 121 by means of a compression spring 127 acting between the ball 123 and the base of the counterbore 116.

The one-way valve assemblies are mounted in the counterbores 110 in opposite directions so that for fluid flows in the same direction one valve assembly is open and the other remains closed. The free outer end of each valve asembly 111 is connected to a pipe-line leading to one of a pair of outlet ports in the control valve 21, 21a (FIGS. 1 and 2).

A single valve member in the form of a ball 124 is housed within a chamber defined by the bore 65d and an adjacent end of the member 67d. The ball 124 is urged towards a seating surrounding the central opening 87d in the member 67d by a compression spring 125 but normally, the ball 124 is held away from the seating by a rod or extension 126 integral with or carried by the adjacent end of the expander piston 83d. The rod or extension 126 is of a diameter less than that of the opening 87d through which it normally projects into bore 65d.

The operation of the actuator in accordance with our present invention is substantially identical with that of the actuator described above with reference to FIG. 4. That is to say, for normal operation of the system, fluid under pressure is supplied from the master cylinder 1, 1a to the slave cylinders of the wheel brakes. The slave cylinders of at least one wheel brakes are supplied with fluid from the outlet port 72d which receives fluid from the bore 65d through the clearance between the rod or extension 126 and the opening 87d in the member 67d, since the ball 124 is held away from its seating.

However, when the deceleration of one of the rear wheels exceeds a predetermined value and the solenoid of the control valve 21, 21a is energized to deliver fluid under pressure from the accumulator 19 or pump 18a to the chamber 78d, the fluid pressure is delivered to the chamber 78d through the one-way valve assembly 111 at the foot of the drawings. That is to say, the pressure fluid pressure acts on the ball 123 to move it away from the seating against the force in the compression spring 117 to permit fluid to enter the chamber 78d through the counterbore 117, the bore 114 and the drilling 79d. The other one-way valve remains closed due to pressure from the accumulator or pump acting on it in an opposite direction. As the expander piston 83d moves rearwardly, the rod 126 is progressively withdrawn through the opening 87d to permit the ball 124 to engage with its seating and cut off the supply of braking fluid to the rear wheel brakes through the opening 87d.

When the deceleration of the wheel attains the predetermined valve the supply of fluid from the accumulator or pump is cut off and, since there is no pressure acting on the uppermost one-way valve 111, as illustrated in the drawings, the pressure of fluid with the chamber 78d is returned to the reservoir 17, 17a through that one-way valve 111 as the expander piston 83d moves forwardly to decrease the effective volume of the chamber 70d. During this forward movement of the expander piston 83d, the rod 126 may engage with the ball 124 to urge it away from its seating and permit the wheel brakes to be re-applied at full pressure as described above.

The damping characteristics of the actuator may be adjusted by altering the diameters of the orifices 121 in the plates 120 within the one-way valves 111. This is achieved by replacing an existing plate 120 with an interchangeable plate provided with an orifice of a different diameter.

In a modification each ball 123 is adapted to engage a seating surrounding a central opening in a plate interposed between the ball 123 and the plate 120. The orifice 121 in each plate 120 is of a diameter smaller than that of the opening in the plate forming the seating to provide restriction for the flow of fluid through the one-way valve assembly 111 in which that plate 120 is incorporated.

In the embodiments of actuator described above with reference to FIGS. 5 and 6 a pair of expander pistons working in spaced parallel bores are adapted to be operated by a single actuator piston. As illustrated in the embodiment of FIG. 8 where corresponding reference numerals qualified by the suffix e have been applied to corresponding parts a single expander piston 83e working in a bore 59e is adapted to control the pressure applied to a pair of separate slave cylinders when the deceleration of a wheel brake or brakes actuated by those slave cylinders exceeds a predetermined value.

Figure 8:
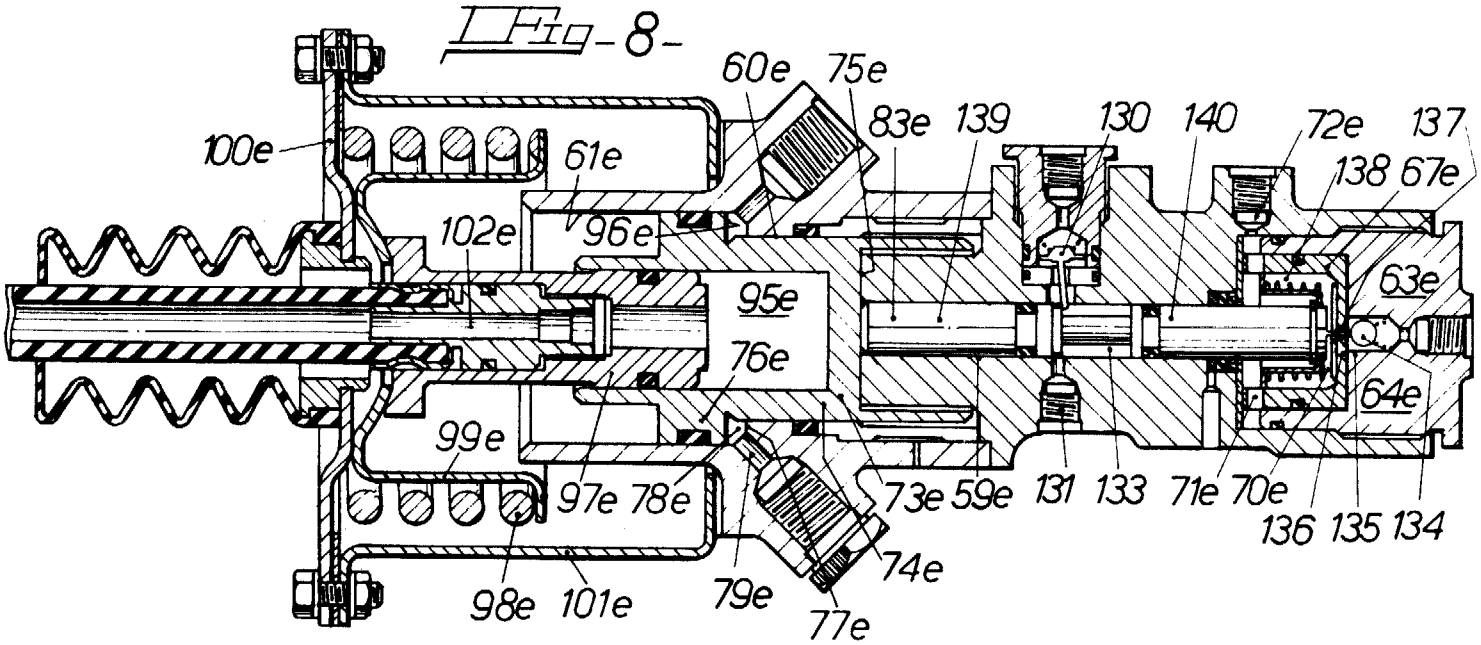
FIG. 8 is a longitudinal section through an actuator incorporating a single expander piston of two-part construction for controlling the effective volume of a pair of chambers.

In the embodiment of FIG. 8 the bore 59e is of substantial length and the wall of the bore 59e, at an intermediate point in its length accomodates a spring loaded tipping valve 130 controlling the supply of fluid under pressure from the master cylinder 1, 1a to a slave cylinder through an outlet port 131 in the wall. The stem 132 of the tipping valve 130 extends into the bore 59e and is received in an axially extending recess 133 of substantial length in the expander piston 83e. Normally the tipping valve 130 is held in a tipped-open position by the engagement with its stem of one end of the recess 133. In this position a ball 134 housed in a bore 135 in the plug 63e is held away from a seating surrounding a central opening 136 in the member 67e by a rod or extension 137 carried by the expander piston 83e and projecting through the opening 136 to engage the ball 134.

When the deceleration of the braked wheel or wheels exceeds the predetermined value and the actuator piston 73e is retracted, the expander piston 83e also retracts due to the provision of a return spring 138 acting between the free end of the expander piston 83e and the member 67e. This allows the valves 134 and 130 to close and cut off the supply of braking fluid to the slave cylinders. Further retraction of the expander piston 83e increases the effective volume of the chamber 70e as described above.

The expander piston 83e comprises a two part assembly. The port 139 in abutment with the actuator piston 73e is then withdrawn further with respect to the other part. This increases the effective volume of a chamber in communication with the other slave cylinder and defined within the bore 59e between the end of the part 139 remote from the actuator piston 73e and the end of the recess 133 which is remote from the end of the part 140 which normally engages with the part 139. Thereafter successive re-application and release of the brakes controlled by the slave cylinders takes place as described above with reference to the preceding embodiments.

We claim:

1. An actuator assembly for a vehicle hydraulic braking system comprising a housing, means defining at least one first chamber in said housing having a first inlet for connection to a fluid pressure source and an outlet for connection to a slave cylinder of a wheel brake, a piston assembly working in a first cylinder bore in said housing in communication with said chamber and movable between a first advanced position and a second retracted position, an actuator piston working in a second cylinder bore in said housing and normally acting on said piston assembly to urge said piston assembly into said first advanced position in which the effective volume of said first chamber is at a minimum value and said inlet and outlet connections are open, said actuator piston having a first area at an end of said actuator piston remote from said piston assembly and a second area opposed to said first area, a movable member [ in said second cylinder bore ] adjacent said first area of said actuator piston, a compression spring urging said movable member towards said actuator piston, means for applying hydraulic fluid under pressure, between said movable member and said first area of said actuator piston to urge said piston assembly into said first advanced position, and a second inlet connection in communication with said second cylinder bore through which hydraulic fluid under pressure is adapted to be admitted into said second bore when the deceleration of a braked wheel controlled by a supply of hydraulic fluid from said outlet exceeds a predetermined value, said supply of hydraulic fluid under pressure admitted to said second bore acting over said second area of said actuator piston to apply to said actuator piston a force to move said actuator piston in a direction away from said piston assembly and permit said piston assembly to be moved towards said second retracted position in which said first inlet connection is closed and the effective volume of said first chamber is increased to reduce pressure in a line between said outlet connection and said slave cylinder.

2. An actuator assembly as claimed in claim 1, incorporating a valve for cutting off communication between said first inlet connection and said chamber upon initial movement of said piston away from said first advanced position.

3. An actuator assembly as claimed in claim 1, wherein said actuator piston is of differential outline working in a stepped bore and engages at its end of smaller diameter with said piston assembly, said first area being located at the base of a recess in the end of said piston of greater diameter, and said second area being defined by a shoulder at a step in diameter between portions of said stepped piston of different diameters.

4. An actuator assembly as claimed in claim 3 wherein said shoulder on said actuator piston is spaced from a complementary shoulder at a step at the change in diameter of said stepped bore when said effective volume of the chamber is at said minimum value, and an annular space between the shoulders and surrounding a portion of said actuator piston of lesser diameter defines a second chamber into which hydraulic fluid under pressure is adapted to be admitted though through said second inlet connection.

5. An actuator assembly as claimed in claim 4, incorporating a metering device for delaying the release of fluid pressure from said second chamber when the supply of hydraulic fluid under pressure to that chamber is terminated.

6. An actuator assembly as claimed in claim 5, wherein said metering device comprising a cup-shaped piston located in said second chamber and having an axially extending skirt and a spring for urging said skirt into sealing engagement with said shoulder at said step at the change in diameter in said stepped bore and wherein said cup-shaped piston incorporates in a wall thereof at least one orifice providing a restricted return path to said second inlet connection for fluid actuator said second chamber after said actuator piston has moved towards said first chamber by a distance sufficient to enable said skirt to seat against said shoulder.

7. An actuator assembly as claimed in claim 6, wherein said cup-shaped piston is slidable guided in a portion of said differential piston of smaller diameter which projects into the portion of said stepped bore of greater diameter, and there is a clearance between an outer peripheral edge of said cup-shaped piston and the wall of said portion of said stepped bore of greater diameter.

8. An actuator assembly as claimed in claim 4, including a third inlet connection in said housing leading to said second chamber, wherein a one-way valve assembly is housed in each of said second and third connections, each one-way valve assembly incorporating a valve member, a seating surrounding an orifice and adapted to be engaged by said valve member and spring means for urging said valve member into engagement with said seating, said one-way valve assemblies being constructed and arranged to operate in opposite directions whereby high pressure fluid is adapted to be supplied to both connections but is applied to said actuator piston only through said one-way valve which opens in that direction, fluid from said actuator piston being returned from said second chamber upon re-application of a wheel brake through said other one-way valve and said connection in which that one-way valve is located, whereby the delay in the re-application of a wheel brake after the deceleration of the wheel has been restored to a predetermined value is controlled by the return of fluid from said actuator piston [to the control valve] through said orifice in said one-way valve in the return connection.

9. An actuator assembly is claimed in claim 8 wherein each orifice is provided in a plate which is interchangeable with a series of similar plates having orifices of different diameters whereby the rate of flow fluid in each connection can be varied in accordance with a desired braking characteristic.

10. An actuator assembly as claimed in claim 3, wherein the movable member is a third piston working in said recess in said end of said actuator piston of greater diameter and having an inner end, wherein said inner end of said third piston defines with said base of said recess forming the first area a third chamber into which hydraulic fluid under pressure is admitted through an axial bore in said third piston.

11. An actuator assembly as claimed in claim 1 incorporating means for delaying re-application of a wheel brake following cut-off and relief of the supply of fluid to a slave cylinder from said outlet connection.

12. An actuator assembly as claimed in claim 1, wherein said piston assembly comprises a single expander piston working in a bore in said housing and controlled by a single actuator piston.

13. An actuator assembly as claimed in claim 1, wherein said piston assembly comprises at least two expander pistons working in separate parallel bores in said housing, said expander pistons being controlled by single actuator piston, and each expander piston being adapted to control the effective volume of a chamber provided with separate inlet and outlet connections and operation of a spring loaded valve means for controlling communication between said inlet connection and said chamber of which the effective volume is variable by that expander piston.

14. An actuator assembly as claimed in claim 1, wherein said piston assembly comprises a two part axially separable assembly adapted to regulate the effective volume of a first and second axially spaced chamber, each provided with an inlet and an outlet connection.

15. An actuator assembly as claimed in claim 14, wherein said first axially spaced chamber is located at the end of said bore in which works said expander piston and into which a free end portion of a first part of said separable assembly extends, and adjacent to the opposite end of said first part is formed an axially extending annular recess with which an adjacent end of a second part of said separable assembly defines said second axially spaced chamber of which the effective volume is variable upon relative axial movement between said first and second parts of separable assembly.

16. An actuator assembly as claimed in claim 15 wherein communication between said inlet and outlet connections with said first axially spaced chamber is controlled by a valve operable by a push-rod carried by the free end of said first part of said separable assembly, and communication between said inlet and outlet connections with said second axially spaced chamber is controlled by a spring loaded tipping valve which is normally held in an open position by the engagement of a stem of the tipping valve with a shoulder at the end of said recess adjacent to said second part of the separable assembly.

*17. An actuator assembly for a vehicle hydraulic braking system comprising a housing having first and second opposite ends, means in said housing adjacent to said first end defining at least one chamber having a first inlet for connection to hydraulic fluid under pressure and an outlet for connection to a slave cylinder of a wheel brake, a valve controlling communication between said inlet and outlet, a piston assembly working in a cylinder bore in said housing in communication with said chamber and movable between an advanced position in which said valve is held open and the effective volume of said chamber is at a minimum value and a retracted position in which said valve is shut and the effective volume of said chamber is greater than the minimum, means in said housing for enabling fluid from a high pressure source to urge said piston assembly to said advanced position, means in said housing for enabling fluid to move said piston assembly to said retracted position when the deceleration of a braked wheel controlled by a supply of hydraulic fluid from said outlet exceeds a predetermined value, a movable member in said housing disposed between said piston assembly and said second end of said housing and movable between a first position in which said member permits said piston assembly to assume said retracted position and a second position in which said member maintains said piston assembly in said advanced* position, resilient means for constantly biassing said movable member to said second position, and means in said housing for enabling the fluid from said high pressure source to hold said movable member in said first position in opposition to said resilient means, whereby, in the event of the pressure of said high pressure source falling, said resilient means can move said movable member to said second position to maintain said piston assembly in said advanced position.

18. An actuator assembly as in claim 17 wherein said piston assembly is adapted to be urged to said advanced position by hydraulic fluid under pressure and wherein said valve is separate from said piston assembly and movable away from a fixed valve seat in said housing by said piston assembly.

19. An actuator assembly as in claim 118 wherein said piston assembly comprises an expander piston working in a first cyliner bore in the housing in communication with said chamber, and an actuator piston working in a second cylinder bore in said housing and acting on said expander piston, said movable member being adapted to maintain said expander piston in said advanced position.

20. An actuator assembly as in claim 17 wherein said housing includes a plurality of said chambers, and a plurality of said valves controlling communication between said inlet and said outlet of each chamber, said piston assembly actuating said valves.

21. An actuator assembly as in claim 20 wherein said piston assembly is adapted to be urged to said advanced position by hydraulic fluid under pressure and wherein said valves are held open by a mechanical coupling between said piston assmbly and said valves.

22. An actuator assembly as in claim 21 wherein said piston assembly comprises a plurality of expander pistons working in a plurality of first cylinder bores, each of said first cylinder bores being in communication with one of said chambers, and an actuator piston working in a second cylinder bore in said housing and acting on each of said expander pistons, said movable member being adapted to maintain all of said expander pistons in said advanced positions.

23. An actuator assembly for a vehicle hydralic braking system comprising a housing having first and second opposite ends, means in said housing adjacent to said first end defining at least one chamber having a first inlet for connection to hydraulic fluid under pressure and an outlet for connection to a slave cylinder of a wheel brake, a valve in said housing controlling said inlet, a piston assembly working in a cylinder bore in said housing in communication with said chamber and operating said valve, said piston assembly being movable between an advanced position in which said valve is held open and the effective volume of said chamber is at a minimum value, a first retracted position in which said valve is shut, and a second retracted position in which said valve is shut and the effective volume of said chamber is at a maximum value, retraction of said piston assembly first closing said valve and then progressively increasing the volume of said chamber, means in said housing for enabling fluid from a high pressure source to urge said piston assembly to said advanced position, means in said housing for enabling fluid to move said piston assembly to said retracted positions when the deceleration of a braked wheel controlled by a supply of hydraulic fluid from said outlet exceeds a predetermined value, a movable member in said housing disposed between said piston assembly and said second end of said housing and movable between a first position in which said member permits said piston assembly to assume said retracted positions and a second position in which said member maintains said piston assembly in said advanced position, resilient means for constantly biassing said movable member to said second position, and means in said housing for enabling the fluid from said high pressure source to hold said movable member in said first position in opposition to said resilient means, whereby in the event of the pressure of said high pressure source falling, said resilient means can move said movable member to said second position to maintain said piston assembly in said advanced position.

24. An actuator assembly as in claim 23 wherein said means for urging said piston assembly to said advanced position and said means for holding said movable member in said first position comprise an accumulator chamber defined between said piston assembly and said movable member, and an inlet leading into said accumulator chamber for connection to said high pressure source, and wherein said means for moving said piston assembly to said retracted position comprise a pressure chamber defined between said piston assembly, on the opposite side to said accumulator chamber, and said housing, and a port leading into said pressure chamber for connection to a supply of hydraulic fluid.

25. An actuator assembly for a vehicle hydraulic braking system comprising a housing, means defining at least one first chamber in said housing, said first chamber having a first inlet for connection to a fluid pressure source and an outlet for connection to a slave cylinder of a wheel brake, a piston assembly working in a first cylinder bore in said housing in communication with said chamber and movable between a first advanced position and a second retracted position, a valve for controlling communication between said first inlet connection and said chamber, said valve being open when said piston assembly is in said first advanced position and being closed upon initial movement of said piston assembly away from said first advanced position, an actuator piston working in a second cylinder bore in said housing and normally acting on said piston assembly to urge said piston assembly into said first advanced position in which the effective volume of said first chamber is at a minimum value and said inlet and outlet connections are open, said actuator piston having a first area at an end of said actuator piston remote from said piston assembly and a second area opposed to said first area, a movable member sealingly engaging said actuator piston to define a second chamber incorporating said first area of said actuator piston, a second inlet connection for admitting hydraulic fluid under pressure into said chamber to act on said first area of said actuator piston to urge said piston assembly into said first advanced position, a compression spring urging said movable member towards said actuator piston, and a third inlet connection in communication with said second cylinder bore through which hydraulic fluid under pressure is adapted to be admitted into said second bore when the deceleration of a braked wheel controlled by a supply of hydraulic fluid from said outlet exceeds a predetermined value, said supply of hydraulic fluid under pressure admitted to said second bore acting over said second area of said actuator piston to apply to said actuator piston a force to move said actuator piston in a direction away from said piston assembly and permit said piston assembly to be moved towards said second retracted position in which said first inlet connection is closed and the effective volume of said first chamber is increased to reduce pressure in a line between said outlet connection and said slave cylinder.

* * * * *